(12) United States Patent
Dorfman

(10) Patent No.: US 9,685,270 B2
(45) Date of Patent: *Jun. 20, 2017

(54) HIGH K DIELECTRIC COMPOSITION FOR THERMOFORMABLE CAPACITIVE CIRCUITS

(71) Applicant: E I DU PONT DE NEMOURS AND COMPANY, Wilmington, DE (US)

(72) Inventor: Jay Robert Dorfman, Durham, NC (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 228 days.

This patent is subject to a terminal disclaimer.

(21) Appl. No.: 14/324,760

(22) Filed: Jul. 7, 2014

(65) Prior Publication Data

US 2016/0005542 A1    Jan. 7, 2016

(51) Int. Cl.
| | |
|---|---|
| *C08L 63/00* | (2006.01) |
| *C08L 71/00* | (2006.01) |
| *C08L 75/04* | (2006.01) |
| *C08L 75/06* | (2006.01) |
| *H01B 3/12* | (2006.01) |
| *H01B 3/30* | (2006.01) |
| *H01G 4/008* | (2006.01) |
| *H01G 4/14* | (2006.01) |

(52) U.S. Cl.
CPC ............... *H01G 4/14* (2013.01); *C08L 63/00* (2013.01); *C08L 71/00* (2013.01); *C08L 75/04* (2013.01); *C08L 75/06* (2013.01); *H01B 3/12* (2013.01); *H01B 3/302* (2013.01); *H01B 3/307* (2013.01); *H01G 4/008* (2013.01); *C08G 2650/56* (2013.01)

(58) Field of Classification Search
CPC .......... H01G 4/14; H01G 4/008; H01B 3/302; H01B 3/307; H01B 3/12; C08L 63/00; C08L 75/04; C08L 75/06; C08L 71/00; C08G 2650/56

See application file for complete search history.

(56) References Cited

U.S. PATENT DOCUMENTS

| | | | | |
|---|---|---|---|---|
| 5,942,330 | A * | 8/1999 | Kelley | B32B 27/08 428/343 |
| 9,303,828 | B2 * | 4/2016 | Dorfman | C08L 71/12 |
| 2009/0170993 | A1 * | 7/2009 | Liu | C08K 3/22 524/413 |
| 2010/0327408 | A1 | 12/2010 | Lee et al. | |
| 2013/0068512 | A1 * | 3/2013 | Dorfman | H01G 4/008 174/257 |
| 2015/0034473 | A1 * | 2/2015 | Arancio | C09K 5/14 200/600 |

FOREIGN PATENT DOCUMENTS

| | | |
|---|---|---|
| JP | 2003049092 A | 2/2003 |
| WO | 2015017490 A1 | 2/2015 |

OTHER PUBLICATIONS

International Search Report and Written Opinion Dated Sep. 24, 2015 for International Patent Application No. PCT/US2015/036412.
"Resin" In "IUPAC Compendium of Chemical Terminology", Feb. 4, 2014, Entire Document, Research Triangle Park, NC XP055212343.
"Data Sheet Disperbyk-164", Sep. 1, 2012, Retrieved From the Internet At URL:http://www.additives-downloads.de.output/ag/aspx?file=tds_disperbyk-164_en.pdf (copy of reference not included).

* cited by examiner

*Primary Examiner* — Patrick Niland

(57) ABSTRACT

This invention is directed to a polymer thick film thermoformable dielectric composition with a high dielectric constant. Dielectrics made from the composition can be used in various electronic applications to enhance the performance of thermoformable capacitive circuits.

19 Claims, No Drawings

HIGH K DIELECTRIC COMPOSITION FOR THERMOFORMABLE CAPACITIVE CIRCUITS

FIELD OF THE INVENTION

This invention is directed to a polymer thick film thermoformable dielectric composition with high dielectric constant (K). Dielectrics made from the composition can be used in various electronic applications to protect electrical elements and particularly to provide a high dielectric constant and thus improve the capacitance in capacitive switches.

BACKGROUND OF THE INVENTION

Dielectrics have long been used to protect electrical elements. They have also been used as isolating layers. Although they have been used for years in these types of applications, the use of dielectrics as high-K layers during thermoforming procedures is not common. This is particularly important in thermoformable capacitive circuits where highly conductive silver is used and anything that increases the capacitance is a very advantageous property particularly after the rigors of thermoforming a circuit. High K (commonly known as dielectric constant or relative permittivity) can have a beneficial effect on the performance of a circuit, often leading to improved signal/noise. One of the purposes of this invention is to improve the capacitive nature of a thermoformable circuit and produce a thermoformable capacitive construction with improved electrical properties.

SUMMARY OF THE INVENTION

This invention relates to a polymer thick film high-K thermoformable dielectric composition comprising:
(a) 15-50 wt % of a first organic medium comprising 10-50 wt % urethane resin dissolved in 50-90 wt % first organic solvent, wherein the weight percent of the urethane resin and the first organic solvent are based on the total weight of the first organic medium; and
(b) 15-50 wt % of a second organic medium comprising 10-50 wt % thermoplastic phenoxy resin in 50-90 wt % second organic solvent wherein the weight percent of the thermoplastic phenoxy resin and the second organic solvent are based on the total weight of the second organic medium; and
(c) 1-70 wt % of a powder of a high-K material with a K of at least 40; wherein the wt % of the first organic medium, the second organic medium and the powder of the high-K material are based on the total weight of the dielectric composition.

The invention is further directed to using the polymer thick film high-K thermoformable dielectric composition to form a protective and/or insulating layer in thermoformable capacitive electrical circuits.

DETAILED DESCRIPTION OF INVENTION

The invention relates to a polymer thick film high-K thermoformable dielectric composition for use in thermoforming electrical circuits.

The substrate commonly used in polymer thick film thermoformable capacitive circuits is polycarbonate (PC). PC is generally preferred since it can be readily thermoformed. However, PC is very sensitive to the solvents used in the layers deposited on it. The wrong solvent can cause cracking or crazing in the PC substrate.

The polymer thick film (PTF) high-K thermoformable dielectric composition is comprised of two organic mediums each comprising a polymer resin dissolved in an organic solvent, and a powder of a high-K material. Additionally, powders and printing aids may be added to improve the composition. Herein weight percent will be written as wt %.

Organic Medium

The first organic medium is comprised of a urethane resin dissolved in a first organic solvent. The urethane resin must achieve good adhesion to both the electrical element, e.g., a silver layer that is deposited on it and the underlying substrate. The urethane resin must also provide elasticity for thermoforming. It must be compatible with and not adversely affect the performance of the electrical element. In one embodiment the urethane resin is 10-50 wt % and the first organic solvent is 50-90 wt % of the total weight of the first organic medium. In another embodiment the urethane resin is 15-35 wt % and the first organic solvent is 65-85 wt % of the total weight of the first organic medium. In still another embodiment the urethane resin is 15-25 wt % and the first organic solvent is 75-85 wt % of the total weight of the first organic medium. In one embodiment the urethane resin is a urethane elastomer. In another embodiment the urethane resin is a polyester-based copolymer.

The second organic medium is composed of a phenoxy resin dissolved in a second organic solvent. The second organic solvent may be the same as the first organic solvent or different solvents may be used. The phenoxy resin adds high temperature capability to the composition and improves moisture permeability, i.e., it helps impede the progress of moisture through the composition. In one embodiment the thermoplastic phenoxy resin is 10-50 wt % and the second organic solvent is 50-90 wt % of the total weight of the second organic medium. In another embodiment the thermoplastic phenoxy resin is 15-45 wt % and the second organic solvent is 55-85 wt % of the total weight of the second organic medium. In still another embodiment the thermoplastic phenoxy resin is 15-35 wt % and the second organic solvent is 65-85 wt % of the total weight of the second organic medium.

The polymer resin is typically added to the organic solvent by mechanical mixing to form the medium. Solvents suitable for use in the polymer thick film composition are recognized by one of skill in the art and include acetates and terpenes such as carbitol acetate and alpha- or beta-terpineol or mixtures thereof with other solvents such as kerosene, dibutylphthalate, butyl carbitol, butyl carbitol acetate, hexylene glycol and high boiling alcohols and alcohol esters. In addition, volatile liquids for promoting rapid hardening after application on the substrate may be included. In many embodiments of the present invention, solvents such as glycol ethers, ketones, esters and other solvents of like boiling points (in the range of 180° C. to 250° C.), and mixtures thereof may be used. Various combinations of these and other solvents are formulated to obtain the viscosity and volatility requirements desired. The solvents used must solubilize the resin. If deposition is to be on polycarbonate, the solvent diacetone alcohol is particularly effective at preventing crazing.

In one embodiment, the polymer thick film (PTF) high-K thermoformable dielectric composition is comprised of 15-50 wt % of the first organic medium and 15-50 wt % of the second organic medium. In another embodiment, the polymer thick film (PTF) high-K thermoformable dielectric composition is comprised of 20-45 wt % of the first organic medium and 20-45 wt % of the second organic medium High-K Powders The polymer thick film (PTF) high-K thermoformable dielectric composition is comprised of a powder of a high-K material with a K of at least 40. In one embodiment, the high-K material has a K of at least 100. In another embodiment the high-K material has a K of at least 500. Examples of some high-K materials are barium titanate, lead zirconium titanate, barium strontium titanate, lead lanthanum zirconium titanate, titanium dioxide and certain glass frits. In one embodiment, the amount of high-K material powder is 1-70% of the composition. In another embodiment the high-K material powder is 20-60 wt % of the total weight of the entire composition and in still another embodiment the high-K material powder is 35-50 wt % of the total weight of the entire composition. It is preferable to keep the particle size of the high-K material powders in the range of 0.5-10 microns so as to avoid any cracking issues.

Additional Powders

Various powders may be added to the PTF high-K thermoformable dielectric composition to improve adhesion, modify the rheology and increase the low shear viscosity thereby improving the printability. One such powder is fumed silica where it has been found to significantly improve the resistance to moisture penetration.

Application of the PTF High-K Thermoformable Dielectric Composition

The PTF high-K thermoformable dielectric composition, also referred to as a "paste", is typically deposited on a substrate, such as polycarbonate, that is somewhat impermeable to gases and moisture. The substrate can also be a sheet of a composite material made up of a combination of plastic sheet with optional metallic or dielectric layers deposited thereupon. In other constructions, the PTF high-K thermoformable dielectric composition may be deposited over an existing silver/dielectric construction.

The deposition of the PTF high-K thermoformable dielectric composition is performed typically by screen printing, but other deposition techniques such as stencil printing, syringe dispensing or coating techniques can be utilized. In the case of screen-printing, the screen mesh size controls the thickness of the deposited thick film.

Generally, a thick film composition comprises a functional phase that imparts appropriate electrically functional properties to the composition. The functional phase comprises electrically functional powders dispersed in an organic medium that acts as a carrier for the functional phase. In the instant invention the functional phase is the high-K material. Generally, the composition is fired to burn out both the polymer and the solvent of the organic medium and to impart the electrically functional properties. However, in the case of a polymer thick film such as the instant polymer thick film high-K thermoformable dielectric composition, the polymer portion of the organic medium remains as an integral part of the composition after drying.

The PTF high-K thermoformable dielectric composition is processed for a time and at a temperature necessary to remove all solvent. For example, the deposited thick film is dried by exposure to heat at 130° C. for typically 10-15 min. to form a high-K dielectric layer. The K of the high-K dielectric layer depends on the K of the high-K material used in the PTF high-K thermoformable dielectric composition.

Capacitive Circuit Construction

The base substrate used is typically 10 mil thick polycarbonate. A thermoformable conductive silver composition such as DuPont 5043 (DuPont Co., Wilmington, Del.) is printed and dried as per the conditions described above. The PTF high-K thermoformable dielectric composition is then printed and dried under the same conditions used for the silver layer. A second high-K dielectric layer may then be printed above the silver conductor as well. Finally, a top layer of DuPont 5043 silver is printed and dried forming a capacitor. A subsequent step which may include thermoforming of the entire unit is typical in the production of 3D circuits. If the high-K dielectric is not used, the capacitive circuit will be subject to diminished electrical performance and the functional circuit will suffer, often leading to reduced sensitivity and response.

In the course of producing a 3-dimensional capacitive circuit, after the thermoforming step, the final step will often be a molding step in which the finished circuit is formed by injection molding using a resin such as polycarbonate. This process is referred to as in-molding and involves higher temperatures. Depending on the resin chosen, these temperatures can typically exceed 250° C. for 10-30 sec. Thus the choice of the resins used in the PTF composition is critical. The combination of the resins used in the instant PTF composition has been shown to survive the in-mold process and produce fully functional circuitry whereas most resins typically used in PTF compositions will not.

EXAMPLE AND COMPARATIVE EXPERIMENTS

Example 1

The PTF high-K thermoformable dielectric composition was prepared in the following manner. The first organic medium was prepared by mixing 20.0 wt % Desmocoll 540 polyurethane (Bayer Material Science LLC, Pittsburgh, Pa.) with 80.0 wt % dibasic esters (DuPont Co., Wilmington, Del.) organic solvent. The molecular weight of the resin was approximately 40,000. This mixture was heated at 90° C. for 1-2 hours to dissolve all the resin. The second organic medium was prepared by adding 27.0% PKHH resin (InChem Corp., Rock Hill, S.C.) to 73.0% dibasic esters and heating as above. 40.0 wt % barium titanate powder (Fuji Corp) was then added as the high-K material and the entire composition was mixed. The composition was then subjected to the three-roll-mill for two cycles at 150 psi.

The composition, based on the total weight of the composition, was:

30.0 wt % First Organic Medium
30.0 wt % Second Organic Medium
40.0 wt % Barium Titanate Powder A circuit was then fabricated as follows:

A pattern of DuPont silver paste 5043 (DuPont Co., Wilmington, Del.) was printed on a 10 mil thick polycarbonate substrate using a 280 mesh stainless steel screen. The silver pattern was dried at 130° C. for 10 min. A print of the PTF high-K thermoformable dielectric composition prepared above was then printed with a 200 mesh stainless steel screen and dried at 130° C. for 10 min. A second print of the PTF high-K thermoformable dielectric composition was then printed and dried at 130° C. for 10 min. These two dried prints formed a high-K dielectric layer. Another layer of DuPont silver paste 5043 was printed with a 280 mesh stainless steel screen and dried 130° C. for 10 min. The resulting circuit was inspected and no evidence of crazing or deformation of the underlying substrate was found. From the measured capacitance and the dielectric layer thickness, the K value was calculated.

Comparative Experiment A

A circuit was produced as described in Example 1. The only difference was that instead of the PTF high-K thermoformable dielectric composition a PTF moisture barrier layer dielectric composition was used.

The PTF moisture barrier layer dielectric composition was prepared in the following manner. A first organic medium was prepared by mixing 20.0 wt % Desmocoll 540 polyurethane (Bayer Material Science LLC, Pittsburgh, Pa.) with 80.0 wt % dibasic esters (DuPont Co., Wilmington, Del.) organic solvent. The molecular weight of the resin was approximately 40,000. This mixture was heated at 90° C. for 1-2 hours to dissolve all the resin. A second organic medium was prepared by adding 27.0 wt % PKHH resin (InChem Corp., Rock Hill, S.C.) to 73.0 wt % dibasic esters (DuPont Co., Wilmington, Del.) organic solvent and heated as above. 0.5% fumed silica (Cabot Corp.) was then added. 5% diacetone alcohol (Eastman Chemical, Kingsport, Tenn.) was added and the entire composition was mixed. The composition was then subjected to the three-roll-mill for one cycle at 150 psi.

The composition, based on the total weight of the composition, was:

47.50 wt % First Organic Medium
47.00 Second Organic Medium
5.00 Diacetone Alcohol Solvent
0.50 Fumed Silica The K value was calculated as described in Example 1.

Comparative Experiment B

A circuit was produced as described in Example 1. The only difference was that instead of the PTF high-K thermoformable dielectric composition a UV-curable dielectric composition was used.

The PTF UV-curable thermoformable dielectric composition was prepared in the following manner. The organic components were added first followed by the inorganic powders. The composition was mixed at medium speed for 45 min. The composition was then subjected to a three-roll-mill for one cycle at 150 psi.

The composition, based on the total weight of the composition, was:

38.35 wt % Ebecryl® 8413 (Cytec, Inc.)
15.00 wt % Ebecryl® 110 (Cytec, Inc.)
5.50 wt % Ebecryl® 1300 (Cytec, Inc.)
7.20 wt % Ebecryl® 7100 (Cytec, Inc.)
0.50 wt % Silicone Flow Additive
3.00 wt % Ciba® Darocur® 1173 (Ciba Specialty (Chemicals, Inc.)
0.65 wt % 2,2 diethoxy acetophenone
1.00 wt % acrylic green dye (Penn Color, Inc.)
25.00 wt % Mistron® Vapor Talc (Imerys Talc)
3.80 wt % Mistron® Ultramix Talc (Imerys Talc)

As a result of using the PTF UV-curable thermoformable dielectric composition, the printed dielectric printed layers were UV-cured at 750 mJ/cm² using a Hg vapor bulb rather than dried.

The K value was calculated as described in Example 1.

The improvement in performance as a result of using the PTF high-K thermoformable dielectric composition is apparent from the results shown in Table 1.

TABLE 1

| Sample | K Value |
| --- | --- |
| Example 1 - High-K Dielectric | 34 |
| Comp. Exp A - Moisture Barrier | 4.6 |
| Comp. Exp B - UV-Curable Dielectric | 4.2 |

What is claimed is:

1. A polymer thick film thermoformable dielectric composition consisting of:
   (a) 15-50 wt % of a first organic medium consisting of 10-50 wt % urethane resin dissolved in 50-90 wt % first organic solvent, wherein the weight percent of the urethane resin and the first organic solvent are based on the total weight of the first organic medium; and
   (b) 15-50 wt % of a second organic medium consisting of 10-50 wt % thermoplastic phenoxy resin in 50-90 wt % second organic solvent wherein the weight percent of the thermoplastic phenoxy resin and the second organic solvent are based on the total weight of the second organic medium; and
   (c) 1-70 wt % of a powder of a high-K material with a K of at least 40;
   wherein the wt % of the first organic medium, the second organic medium and the powder of the high-K material are based on the total weight of the dielectric composition.

2. The polymer thick film thermoformable dielectric composition of claim 1, wherein said urethane resin is a urethane elastomer or a polyester-based copolymer.

3. The polymer thick film thermoformable dielectric composition of claim 2, wherein said urethane resin is an elastomer.

4. The polymer thick film thermoformable dielectric composition of claim 1, consisting of:
   (a) 20-45 wt % of said first organic medium consisting of 15-35 wt % urethane resin dissolved in 65-85 wt % first organic solvent, wherein the weight percent of the urethane resin and the first organic solvent are based on the total weight of the first organic medium; and
   (b) 20-45 wt % of the second organic medium consisting of 15-45 wt % thermoplastic phenoxy resin in 55-85 wt % second organic solvent wherein the weight percent of the thermoplastic phenoxy resin and the second organic solvent are based on the total weight of the second organic medium; and
   (c) 20-60 wt % of the powder of a high-K material with a K of at least 40;
   wherein the wt % of the first organic medium, the second organic medium and the powder of the high-K material are based on the total weight of the dielectric composition.

5. The polymer thick film thermoformable dielectric composition of claim 1, wherein the high-K material has a K of at least 100.

6. The polymer thick film thermoformable dielectric composition of claim 5, wherein the high-K material has a K of at least 500.

7. The polymer thick film thermoformable dielectric composition of claim 4, wherein the high-K material has a K of at least 100.

8. The polymer thick film thermoformable dielectric composition of claim 7, wherein the high-K material has a K of at least 500.

9. The polymer thick film thermoformable dielectric composition of claim 1, wherein the high-K material is selected from the group consisting of barium titanate, lead zirconium titanate, barium strontium titanate and lead lanthanum zirconium titanate.

10. A capacitive switch circuit comprising a dielectric layer formed from the polymer thick film thermoformable dielectric composition of claim 1, wherein the capacitive switch circuit has been thermoformed.

11. The capacitive switch circuit of claim 10, wherein the capacitive switch circuitry has been subsequently subjected to an injection molding process.

12. The capacitive switch circuit of claim 10, further comprising;
(a) a substrate;
(b) a first electrical conductor deposited on the substrate; and
(c) a second electrical conductor;
wherein the dielectric layer is deposited between the first electrical conductor and the second electrical conductor thereby forming a capacitor.

13. The capacitive switch circuit of claim 12, wherein the first electrical conductor and the second electrical conductor are silver.

14. The capacitive switch circuit of claim 12, wherein the high-K material used in the polymer thick film thermoformable dielectric composition of claim 1 has a K of at least 500.

15. The capacitive switch circuit of claim 12, wherein the high-K material used in the polymer thick film thermoformable dielectric composition of claim 1 is selected from the group consisting of barium titanate, lead zirconium titanate, barium strontium titanate and lead lanthanum zirconium titanate.

16. The capacitive switch circuit of claim 12, wherein the capacitive switch circuit has subsequently been subjected to an injection molding process.

17. A capacitor comprising two electrical conductors separated by a dielectric layer formed from the polymer thick film thermoformable dielectric composition of claim 1, wherein the capacitor has been thermoformed.

18. The capacitor of claim 17, wherein the high-K material used in the polymer thick film thermoformable dielectric composition of claim 1 has a K of at least 500.

19. The capacitor of claim 17, wherein the high-K material used in the polymer thick film thermoformable dielectric composition of claim 1 is selected from the group consisting of barium titanate, lead zirconium titanate, barium strontium titanate and lead lanthanum zirconium titanate.

* * * * *